Nov. 1, 1966  E. G. PANCOE  3,281,962
MOTION SYSTEM FOR AN AIRCRAFT FLIGHT SIMULATOR
Filed July 31, 1964  3 Sheets-Sheet 1

INVENTOR.
EDWARD G. PANCOE
BY Frederick J. Smyth
ATTORNEY

Nov. 1, 1966 E. G. PANCOE 3,281,962
MOTION SYSTEM FOR AN AIRCRAFT FLIGHT SIMULATOR
Filed July 31, 1964
3 Sheets-Sheet 2

INVENTOR.
EDWARD G. PANCOE
BY
ATTORNEY

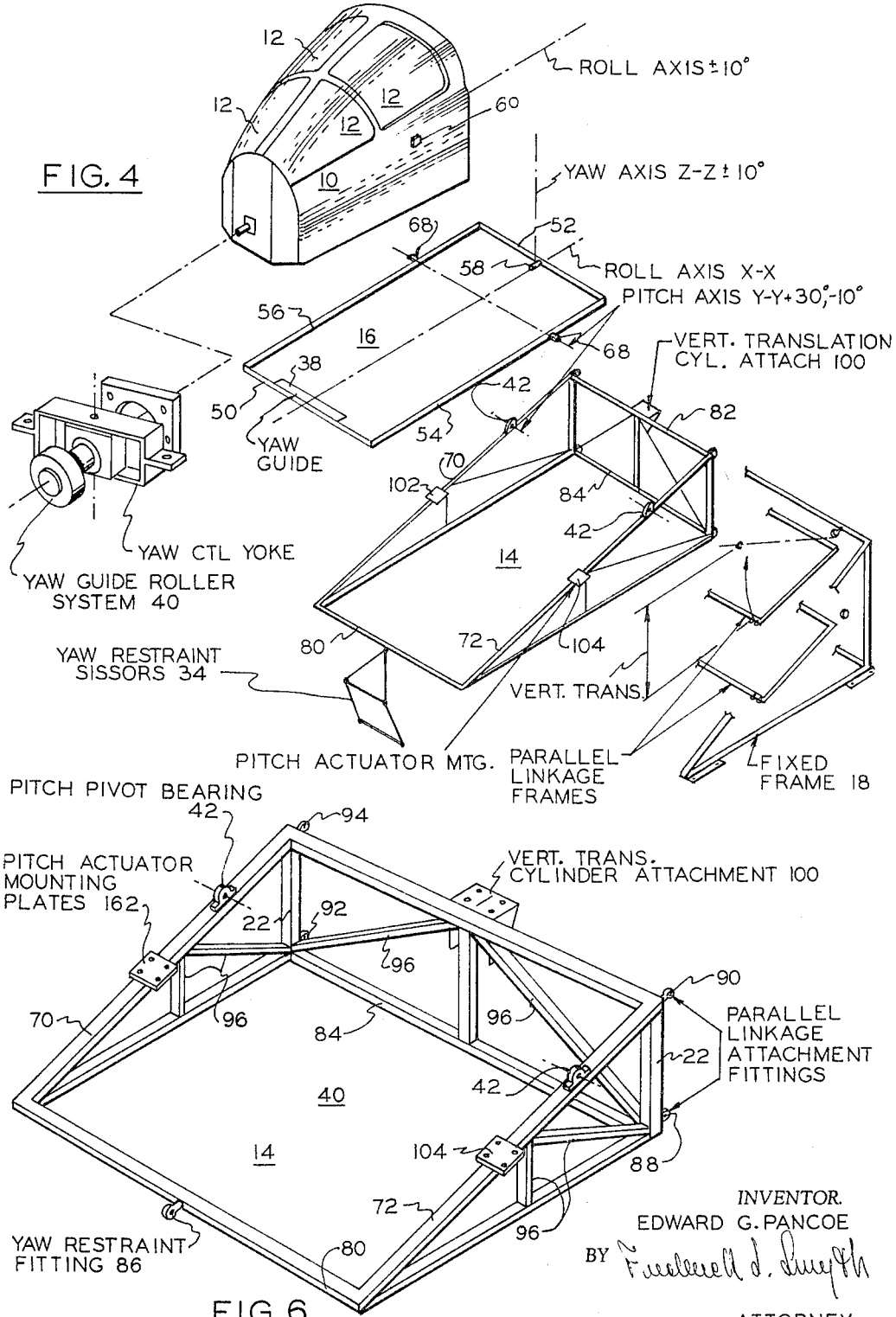

3,281,962
MOTION SYSTEM FOR AN AIRCRAFT FLIGHT SIMULATOR
Edward G. Pancoe, Broome County, N.Y., assignor to General Precision, Inc., Binghamton, N.Y., a corporation of Delaware
Filed July 31, 1964, Ser. No. 386,673
14 Claims. (Cl. 35—12)

This invention relates to a motion system, and more particularly to an improved motion system for the student's station, or "cockpit," of a grounded flight trainer.

As has long been known, the realism and training value of simulated flight conditions are enhanced by the incorporation of cockpit motion, and a number of present day flight simulators incorporate at least some apparatus for moving the cockpit through limited distances in order to simulate the transient motions encountered by the aircraft being simulated. It should be understood that the term "cockpit" includes the well known flight deck of modern aircraft which provides space for two, three or more persons, such as a pilot, copilot, a flight engineer, etc. The distances through which the grounded flight trainers of the prior art have been movable are inherently limited, since the trainer is normally installed within a building or other limited volume structure, and the required motion signals are provided by a large scale computer apparatus. However, the proprioceptive effects provided by such limited movement of the simulated cockpit under many conditions, realistically simulate the transient effects produced by actual aircraft motion through much greater angles, by utilizing various known techniques.

An actual aircraft has, of course, like any rigid body, six degrees of freedom of motion; three being translational and three being rotational. The more of these six independent motions included in the aircraft simulator, the greater will be the realism of the simulated flight. However, such motion systems become extremely complex and expensive when it is considered that modern aircraft cockpits contain a large number of instruments and controls which must be either simulated or duplicated, and, since such cockpits must include space for a number of persons, the movable stations in present day simulators are relatively heavy. In general, cockpit motion systems included with present day flight trainers have been limited to, at most, three independent degrees of freedom, namely, roll, pitch, and vertical translation, and, normally, the allowable limits of each of these three interdependent motions have been severely limited.

By way of example, previous motion systems have inevitably tended to detract from simulator training value because of the unrealistic limitations imposed on each degree of freedom when some other degree of freedom has been exhausted. During a training exercise in which the simulator is making a high-speed, low-level pass and then suddenly is pulled up and rolled to avoid a terrain obstacle, if, on pulling up, the limit of pitch travel is attained, and the pitch and roll modes of the motion system are not independent, then either the subsequent roll control movement will have no effect whatsoever on the cockpit altitude, or, if provision has been made for automatic pitch relaxation in order to permit roll in such cases, the cockpit will undergo an uncalled-for change in pitch attitude. In either case, the illusion of being in an actual aircraft will be destroyed for a time, and training value will suffer as a result.

The effectiveness with which a given amount of aircraft motion is realistically simulated by a scale down motion applied to the grounded flight trainer cockpit, depends greatly upon how much the actual aircraft motions must be scaled down, and hence the greater the distances through which the simulated cockpit may be moved, the greater the percentage of actual aircraft motion that can be simulated. Further, to conserve space, in order that movable trainer cockpits may be installed in either rooms with low ceilings or in trailers and the like, it is highly desirable that the trainer cockpit motion system occupy a minimum of space, while still providing the maximum amount of motion possible.

A typical motion system of the prior art is described in U.S. Patent No. 2,930,144. As there shown, limited rotational and translational movement are provided to the trainer cockpit by means of a structure positioned beneath the simulator cockpit, and since, for the reasons listed above, such a structure must be quite heavy and massive, the positioning of such structures beneath the cockpit drastically reduces the space available for cockpit motion, thereby severely limiting the amount of motion available. Additionally, the three degrees of motion provided therein are necessarily interdependent.

According to the present invention, however, there is provided an improved flight simulator which not only overcomes all the disadvantages of the prior art in an economical and efficient manner, but also provides at least four independent degrees of freedom of motion throughout distances not heretobefore possible. In a preferred embodiment of the invention, four independent degrees of freedom of motion are available wherein all of the motions are capable of simultaneously achieving their maximum limits. That is, each one of the four degrees of freedom, such as pitch, roll, yaw, and vertical translation, is capable of achieving its full limits of travel regardless of the position of the other degrees of freedom of motion. Further, it is important to note that there are no coincidental effects of one degree of freedom upon another. Briefly, the motion system according to the invention includes a simple yoke frame which does not encroach on space beneath the cockpit. However, it should be understood that actuating such a yoke frame has heretofore suffered from two major disadvantages when vertical translation is necessary:

(1) The load on the vertical translation actuator is amplified by the distance from the pivot point to the load, divided by the distance from the pivot point to the actuator, and (2) Any vertical translation results in a change of the pitch angle of the cockpit.

Each of the above-listed disadvantages can be overcome by positioning the pivot point at infinity, and therefore the present invention employs a four-bar linkage network which inherently exhibits a pivot point located at infinity. This particular linkage network imposes a load on the vertical translation actuator of only the cockpit plus frame loading regardless of placement of the cockpit on the yoke. This outstanding feature, then, increases the potential acceleration capabilities of the motion system without any additional requirement for correcting pitch attitude while utilizing a minimum of space. Further, such an arrangement for the vertical translation cylinder permits a simulated pitch pivot far behind the cockpit, by programming both the pitch and vertical actuators simultaneously. It should additionally be noted that progressive development of the independent operation in each degree of freedom merely requires another frame nested inside the vertical translation frame from which full pitch is obtained at any elevation of the vertical translation actuators. Also, two further degrees of freedom of motion, such as roll and yaw, are included within the pitch frame, and a yaw restraint roller and channel device, used with pitch in prior art motion systems, is now, mounted horizontally, and utilized as a yaw guide with the associated actuators attached to a yoke on the roll axis. In this manner, a roll axis may be positioned at any elevation through the cockpit.

It further should be noted that each of the two movable frames in the present motion system is designed as a closed yoke, resulting in a simplified structure, while permitting a scissors-type yaw restrainer to be installed at the front of the pitch frame. Additionally, this restrainer is located in the void required to accommodate roll clearance on the simulated cockpit and therefore does not interfere with the space required for maximum clearance. Also, balance cylinders, or the like, may readily be installed in the spacious area on the parallel guide links, in order to overcome the initial frame and cockpit loads, and enhance the vertical acceleration capabilities, all as more particularly hereinafter described.

One object of the invention is to provide an improved motion system for the student's station, or "cockpit" of a grounded flight trainer.

A further object of the invention is to provide a grounded flight trainer motion system operable to supply at least four independent degrees of freedom of motion.

Yet another object of the invention is to provide an improved grounded trainer cockpit-actuating system in which the cockpit may independently be moved through greater distances than heretofore possible.

A further object of the invention is to provide an improved motion system wherein motion in one degree of freedom is entirely independent from, and does not affect, motion in another degree of freedom.

Another object of the invention is to provide an improved motion system for a flight simulator which occupies a minimum of space.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 4 is an exploded view of the apparatus illustrated in FIG. 1.

FIG. 6 is an isometric view of the vertical translation or Z frame, illustrated in FIG. 1.

As an aid in understanding the central concepts of the invention, a specific embodiment will next be described in detail, it being understood that a wide range of parameters may be selected other than those individually recited without departing from the scope of the invention. In the selected embodiment now being described, the motion system provides, through normal control by an associated computer, *independently* operable ranges of pitch, roll, yaw, and vertical translation up to the following selected values: 30° of nose-up and 10° of nose-down pitch, 10° of left and right roll, 10° of left and right yaw, and ±12 inches (24 inches total) of vertical translation. The motion system also provides angular accelerations of 50°/sec./sec. in roll and yaw and 25°/sec./sec. in pitch, as well as plus and minus 0.8 g's of vertical acceleration beyond the normal 1.0 g environment, and the motion system is capable of operating at any acceleration from zero up to the above tabulated accelerations. Additionally, the system is capable of returning at a subliminal rate to the zero-roll, zero-yaw position and to the neutral-vertical position after zero-acceleration conditions are re-established for the simulated maneuver, which return is more commonly defined as "washout." Further, the system operates over the entire range of velocities and accelerations in an extremely smooth manner that realistically reproduces for the trainee the actual motions experienced by the actual aircraft being simulated.

The motion system is preferably hydraulically powered, since hydraulic systems normally better provide the required power together with fast response time, compact packaging, smooth action, and a lower noise level than either electrical or pneumatic systems. The motion system utilizes five actuators in this specific embodiment; one each for the independent vertical translation, roll and yaw motions, and two for the pitch motion, while being securely fastened (lagged) to the simulator room or trailer floor to prevent creepage of the motion system during motion actuation.

Figure 1:
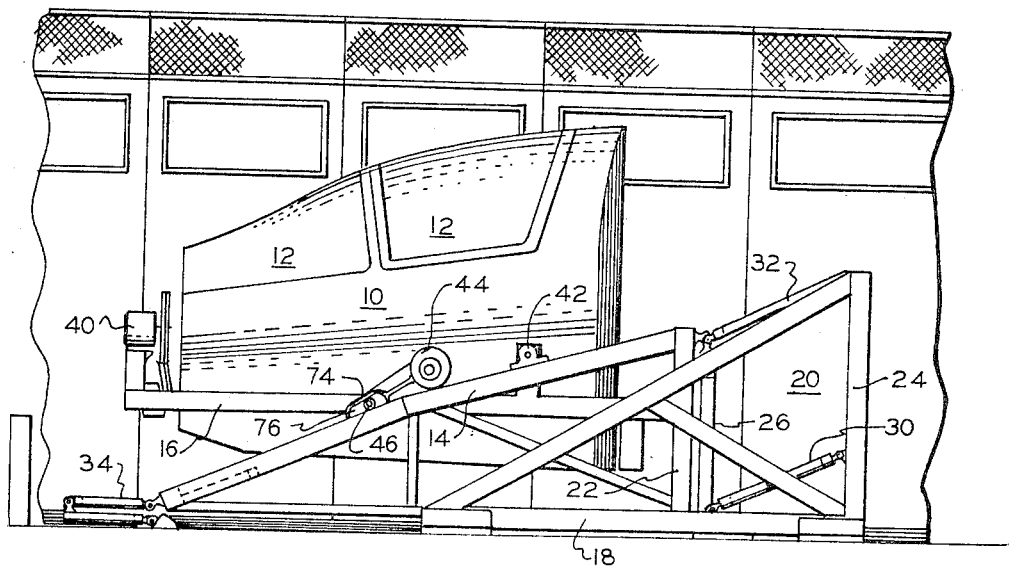
FIG. 1 is a side view of a grounded flight trainer installation incorporating a preferred embodiment of the motion system of the invention.

Referring now to the drawings, FIG. 1 is a side view of a grounded flight trainer installation incorporating a preferred embodiment of the motion system of the invention. As there shown a cockpit 10, positioned for movement, contains seats for one or more trainees and other operating personnel, a large number of simulated indicators and controls, hydraulic actuators for imparting loading forces to various ones of the controls, and certain other conventional devices, none of which are shown since they form no part of the present invention. The cockpit is furnished with a plurality of windows 12, 12, which frequently are either frosted or masked, unless the simulator is to be used in conjunction with a visual display device, in which case conventional aircraft windows are employed. The cockpit is supported, and the movement thereof controlled by a pair of frames, the first of which is the vertical acceleration, or Z frame 14 specifically illustrated in FIG. 6, and the second of which is the inner, or pitch frame 16, which is more specifically shown in FIG. 5. Frame 14, which positions inner frame 16, is attached to a stationary base member 18 by a four-bar parallelogram mechanism, generally illustrated at 20. The two vertical side members 22 and 24 remain vertical in all positions resulting from actuation of the motion system, and since the end vertical translation frame 14 forms one of these vertical sides, the platform therefore always remains horizontal. The vertical translation frame is raised and lowered by a single cylinder 26, located *behind* the cockpit and attached to the vertical side of the mechanism formed by the frame platform. Such a four-bar parallelogram mechanism has been selected for providing the necessary vertical translation, as it possesses several very desirable advantages over other linkage systems.

Figure 7:
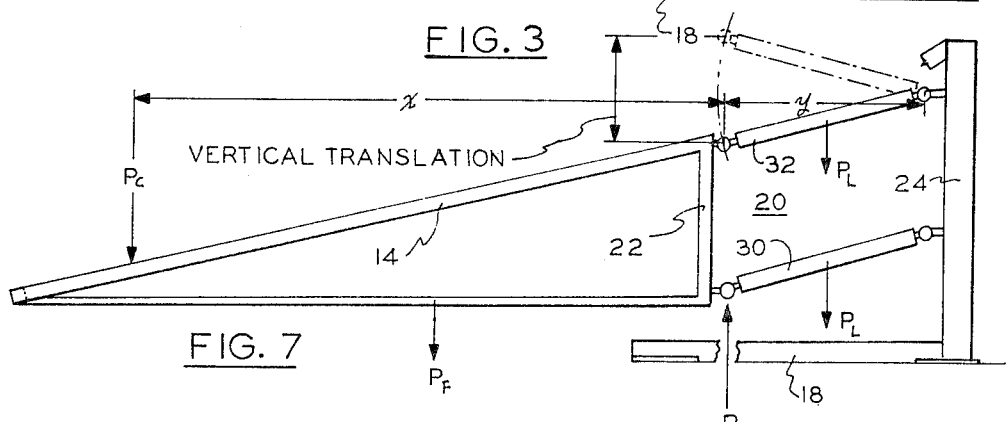
FIG. 7 is a side view showing the Z frame and the associated parallel linkage mechanism illustrated in FIG. 1.

A first of these advantages is that it enables actuating cylinder 26 to be located behind the cockpit rather than beneath the cockpit, and thereby drastically reduces the height of the entire cockpit-motion system assembly. It should be understood that a lower cockpit-motion system assembly has many advantages, such as greater motion capabilities in a room or trailer of limited ceiling height, easier access for trainees, and safer accessibility for service personnel to both the cockpit and the motion system components. Another of the advantages of the four-bar parallelogram mechanism is that the load imposed on the vertical translation cylinder is equal to the weight of the moving mass, *regardless* of how far the cylinder is located from the center of gravity of the moving mass. This is another important feature of the invention and may not be self-evident until one considers the forces and reactions on the vertical translation platform, the four-bar parallelogram mechanism and the stationary base. As shown in FIG. 7, the forces acting on the vertical translation platform include:

$Pc$ = the weight of the cockpit or payload,
$Pf$ = the weight of the frames,
$Pl$ = the weight of the parallel linkage, and
$Pt$ = total load on cylinder.

It can be seen that statically:

$$Pt = Pc + Pf + \frac{1}{2}(2Pl)$$

and is *independent* of the indicated dimensions $x$ and $y$.

Since the force on the actuating cylinder never exceeds the force of the moving mass, and the moving mass time 0.8 g acceleration does not result in excessive forces, it is possible with the motion system to provide the vertical translation with only a single one of hydraulic cylinders 26. An assumed moving weight of 6000 pounds, together with the necessary 0.8 g acceleration, requires merely a 3000 p.s.i. hydraulic system, and together with a normal margin of safety, results in actuating cylinder 26 having an internal diameter of approximately 2.5 inches, a value well within the normal range for components for equipment of this type, as will be understood by those skilled in the art.

Figure 3:
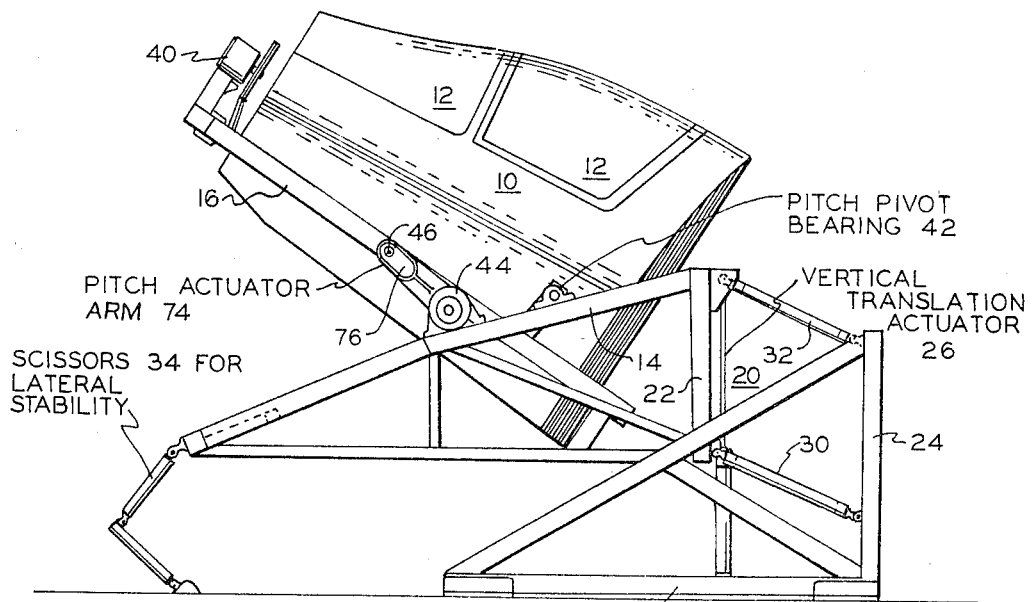
FIG. 3 is a side view of the embodiment illustrated in FIG. 1 further showing the cockpit of the grounded flight trainer pitched and translated upward to its maximum limits.

Among other advantages of the four-bar parallelogram mechanism include the feature that the single actuator so located is "fail-safe," in that any time the hydraulic system is shut down or the hydraulic pressure lost, the vertical translation system will merely settle down to its full-down position, while at all times remaining horizontal. Also, it is never possible in the improved motion system, in contradiction to the systems provided by the prior art, for frame 14 to rock or be driven into the floor due to control failure. Further, the system ensures vertical translation without any coincidental effects of pitching, rolling, or yawing. It should further be understood that the vertical translation platform will be laterally restrained by the four-bar linkage mechanism. However, in order to further properly insure lateral stability during operation of the yaw and roll modes of operation, a scissor mechanism 34 is included at the forward end of platform 14, as shown in FIG. 3.

More specifically now, the motion system of the invention includes two moving frames, 14 and 16, of trussed tubular construction surrounding cockpit 10. The inner frame 16 is herein called the pitch frame, and the outer frame is denoted as the vertical translation frame. The pitch frame, illustrated in detail in FIG. 5, in generally rectangular shape, and contains the yaw and roll pivot point behind the cockpit station, which also operates as the rear support of the cockpit. A roll cylinder 36 (see FIG. 2) is attached to frame 16 and cockpit 10, and is operative to provide roll in the conventional manner. A yaw guide 38 and roller system 40 is mounted horizontally on the forward portion of frame 16 opposite the roll pivot point and additionally serves as a yaw track and forward support means for cockpit 10.

Also included with and joining a part of frame 16 are a pair of bearings 42, 42 positioned on each side rail 70 and 72 of the frame to function as the necessary pitch pivot points. These bearings 42 permit the full pitch range of +30°, −10° to be attained (see FIG. 3) within vertical translation frame 14 which surrounds pitch frame 16. This pitch motion is accomplished by a pair of actuators 44—44, coupled through a pair of bearings 46, 46 secured to frame 16 at a selected distance from pivot bearings 42 in order to provide an adequate moment arm.

Figure 2:
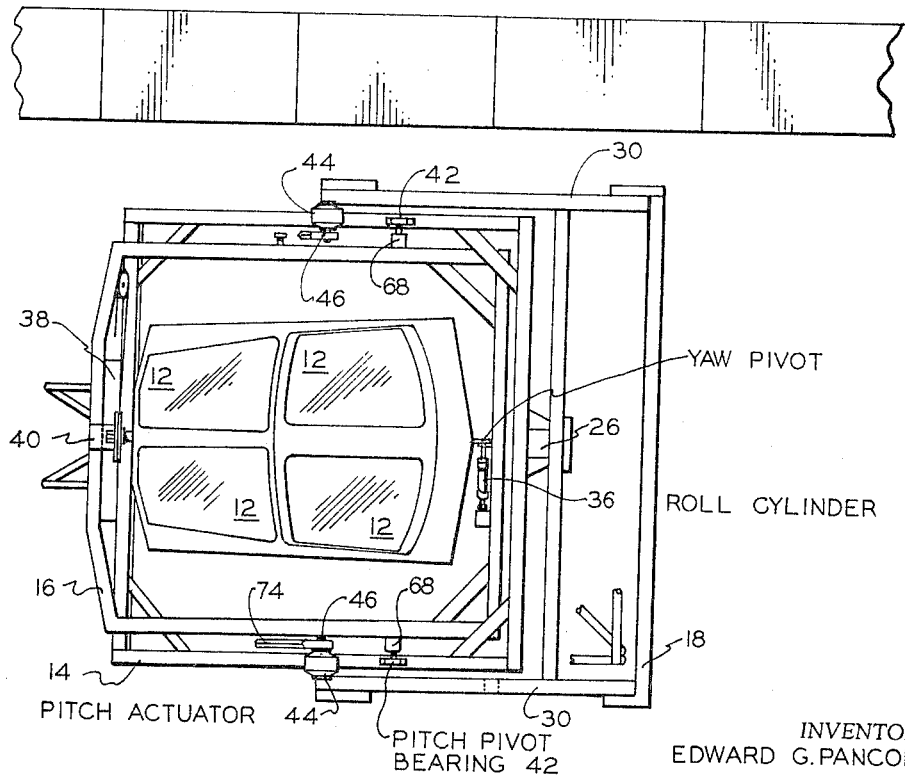
FIG. 2 is a plan view of the embodiment illustrated in FIG. 1.

The outer or vertical translation frame 14 detailed in FIGS. 6 and 7 is generally rectangular in plan view and surrounds pitch frame 16 with adequate clearance to allow the selected independent three degree of motion within its structure. The pitch actuators 44 are mounted on each opposite side of this frame and cooperate with the associated bearings 46 mounted on pitch frame 16. Additionally, pitch pivot point bearings 42 are also positioned on frame 14 as shown in FIG. 2, and the forward horizontal bar of frame 14 is coupled to scissor-type yaw-restraining linkage 34. Vertical translation frame 14 is nested inside rigid and fixed base member 18, which is lagged to the floor of the building or trailer within which the simulator and motion system is installed. Additionally, by means of the novel coupling attachment between vertical translation frame 14 and supporting base member 18 comprising parallel four-bar linkage mechanism 20, it is necessary that the motion platform be supported with a vertical force equal only to the cockpit weight plus frame weights, and is completely independent of the placement of the cockpit within the frames. These parallel linkage arms are again preferably of tubular construction, and torsionally adequate to restrain the vertical translation frame from twisting in a roll attitude.

Figure 5:
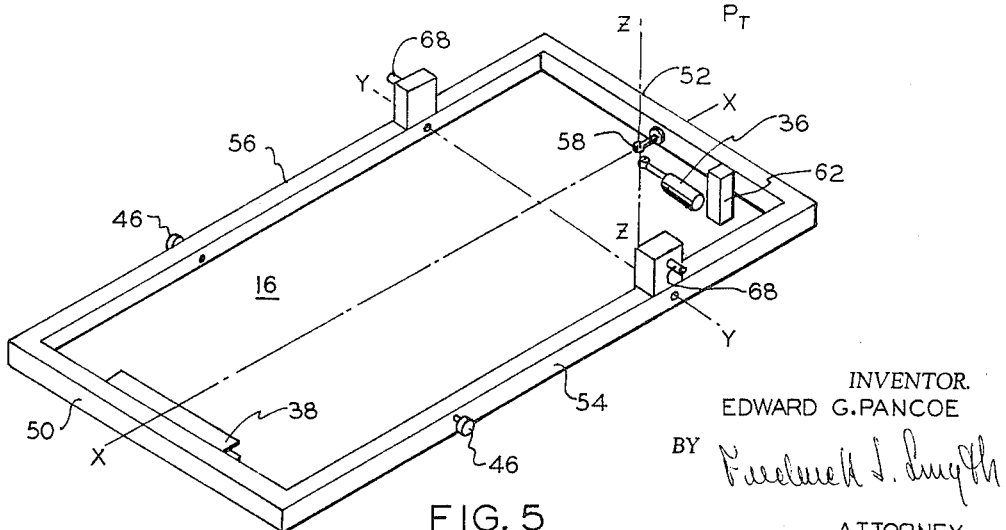
FIG. 5 is an isometric view of the pitch frame illustrated in FIG. 1.

Referring specifically now to FIG. 5, pitch frame 14 is generally rectangular in shape, and is formed by a forward cross member 50, a rear cross member 52, and left and right side members 54 and 56. Attached to the midpoint of rear cross member 52 is an inwardly-facing universal ball-joint 58 which engages a cooperating ball socket 60 (see FIG. 4) located on the rear of cockpit 10. A hydraulic roll cylinder assembly 36 is connected to act between a rigid member 62 affixed to frame 16 and cockpit 10, to rotate cockpit 10 about axis X—X, the roll axis, each end of cylinder 36 being pivotally attached.

The forward end portion of cockpit 10 is supported and restrained by yaw guide 38, which is fixedly mounted on forward member 50 of pitch frame 16. A hydraulic yaw actuator 40 is also mounted on front member 50 and is operable, under control of the associated computer, to swing the forward end of cockpit 10 back and forth in yaw guide 38, and since, as stated above, the rear end of cockpit 10 is held fixed by ball-socket joint 58, 60 it can be seen that the cockpit will be effectively rotated about an axis Z—Z, which is perpendicular to both roll axis X—X and pitch axis Y—Y. Further, rigidly attached to side members 54 and 56 of pitch frame 16 are pitch pivot shafts 68, 68 which are journalled in bearings 42, 42 carried on side members 70 and 72 (see FIG. 6) of vertical translation frame 14, and, therefore, pitch frame 16 and cockpit 10 may be rotated about pitch axis Y—Y, as more particularly shown in FIG. 3. A pair of hydraulic pitch actuators 44, 44 each having a rotary crank arm 74 connected thereto, are fixedly mounted on side members 70 and 72 of vertical translation or Z frame 14. A slot 76 in crank arm 74 engages shaft 46 in each side member 54 and 56 of the pitch frame, and thus rotation of crank arms 74 causes pitch frame 16 and cockpit 10 to rotate about axis Y—Y.

In FIG. 6 there is illustrated the vertical translation frame comprising side members 70 and 72, a front cross-member 80, and a pair of rear cross-members 82 and 84. Secured to the mid point of front cross member 80 is a yaw restraint fitting 86 which is coupled to scissors 34 to ensure lateral stability. Also secured to rear cross members 82 and 84 are the attachment fittings 88, 90, 92, and 94 for coupling frame 14 to the novel four-bar linkage mechanism 20. Additionally, a number of bracing members, indicated generally as 96 are shown to provide mechanical support, the number and positioning of the braces being selected in accordance with the cockpit load. Further, as shown in FIG. 6, frame 14 includes pitch pivot bearings 42, a fixedly-secured vertical translation attachment plate 100 for cylinder 26, and pitch actuator mounting plates 102 and 104. An exploded view of cockpit 10, pitch frame 16, and vertical translation frame 14 is illustrated in FIG. 4, which shows the preferred interconnection of the various units of the motion system of the present invention.

The motion system above described is capable of pitching up to 30° with full vertical translation, yaw, and roll as shown in FIG. 3. It is possible, in accordance with the programming of the computer, to simultaneously actuate the pitch actuators and the vertical translation actuator so as to locate the "effective" pitch axis at any distance behind the trainees, to realistically simulate pitch rotation about the actual pitch axis of the aircraft. The motion system is also capable, by minor modifications, to provide pitch angles up to 90° pitch up and down, if the limits of total simulator height are increased to accommodate this motion.

Mounted on pitching frame 16 are the yaw guide 38, the yaw actuator 40, and the roll actuator 36. The yaw actuator is a single rotary hydraulic actuator positioning the simulator cockpit through a high-tensile-steel-cable drive. The yaw motion system pivots about a vertical axis located aft of the cockpit as shown in FIG. 2. The roll actuator is a linear hydraulic cylinder directly positioning the simulator cockpit in roll. Since the roll axis X—X is built directly onto the simulated cockpit frame, the roll axis passes essentially through the true roll axis of the simulated aircraft.

The simulator is maintained in a level position in respect to pitch, yaw and roll by conventional leveling mechanisms (not shown) when the motion system is turned off. Electrical stops are provided on these leveling mechanisms so that the motion system cannot be activated when the mechanisms are in place. Upon activation of the motion system by the flight instructor, the simulator will center, under hydraulic power, to clear the mechanisms, at which time the mechanisms will rotate out of the envelope of motion of the system. When the leveling mechanisms reach their full withdrawn position they activate interlock switches which thereupon permit full motion activation. If any of the electromechanical limit switches on the hydraulic actuators should be activated while the motion system is operating, owing to an erroneous signal from the motion computer or the like, the hydraulic power supply is automatically turned off and a solenoid-operated flow valve to the motion system is closed in accordance with standard practice. This requires reactivation of the hydraulic power and motion systems through the instructor's over-ride switch, which then re-energizes a pump time-delay circuit and the control loading restrictor valve, so that the trainer motion system and control loading system may be returned to normal position without the danger of violent maneuvers, due to repositioning during the period unavailability of hydraulic power. After a short period of time, not exceeding 10 seconds, during which the simulator will assume the motion attitude at a smooth and slow rate as called for by the control positions, full motion system activation is again feasible.

The hydraulic acuators are preferably controlled by four-way hydraulic servo valves. Upon receiving the command signals from the associated computer, the valves control the direction and flow rate of the hydraulic fluid to the actuators. Feedback is used in the servo loops to ensure smooth response without hunting and/or overshoot. Because of inherent space limitations, the simulated motion system reproduces the accelerations and directions of the motion up to the limits previously selected, but, of course, does not reproduce either the displacement or velocity of the actual aircraft being simulated. In all cases, all instrument indications reflect those of the actual simulated flight conditions, regardless of cockpit attitude.

As will be understood by those skilled in the art, all normal motions are limited by the computer; however, an elaborate protective system may be incorporated in the motion system to protect operating personnel and equipment in case of component malfunction. In addition to limiting the travel of each hydraulic cylinder electronically by limiting the maximum inputs to the servo valves, each cylinder may have electromechanical limit switches which automatically terminate motion when the limits are reached. Beyond these limits, cushion stops of sufficient strength and proper deceleration rates are provided so that the motion is terminated safely in case of complete electrical failure. Activation of the motion system is under the control of the flight instructor only. However, emergency deactivation switches may be provided at each of the seats in the flight compartment.

The motion system, as should be understood, is also capable of producing both stall buffet and Mach buffet conditions up to a frequency of five cycles per second. The capacity of the hydraulic system is sufficient to maintain continuous buffet, and the buffet signals are normally generated by the flight computer and are available when the motion system is activated.

The four independent degrees of freedom of motion are generally controlled by signals from the computer. These signals will be computed in the following manner, by way of example:

Vertical translation =

$$K_1 + \frac{K_2 S}{K_3 S + 1}(A_{ZA+a1}) + K_4 0 + K_{BUFFET}$$

where the $K_1$ term centers the motion to permit both up and down motions, the second term is the basic vertical translation computation with "wash-out," the $K_4 0$ term enables the "effective" pitching axis to be located aft of the motion system at the true location for the aircraft, and the $K_{BUFFET}$ term provides an oscillation dependent on the flight regime.

$$\text{Pitch} = K_5 + K_6 0$$

where the $K_5$ term centers the motion to permit both nose-up and nose-down pitch, and the $K_6 0$ term is the pitch computation.

$$\text{Yaw} = K_7 + \frac{1}{K_8 S + 1}$$

where, again, the $K_7$ term centers the motion to permit both left and right yaw, and the second term is the yaw computation with "wash-out"

$$\text{Roll} = K_9 + p_a \frac{1}{K_{10} S + 1} + K_{11}$$

where the $K_9$ term centers the motion to permit both left and right roll, the second term is the basic roll computation with "wash-out," and the $K_{11}$ term provides a small amount of roll to correctly orientate the g vector experienced by the trainees during sustained yawing.

It should further be noted that the preferred embodiment of the motion system as above described affords a number of additional advantages which have not been attainable in the motion systems of the prior art. Included among these advantages are the provision of four completely independent degrees of motion freedom, full vertical clearance of the cockpit, as shown in 2 and 3, by way of example, with all framework and actuators outside of the cockpit vertical profile, complete independent operation of all motion actuators throughout their full range of motion, resulting in simple computer programming and more effective simulation, obtaining vertical motion via a single cylinder with no resulting change of pitch, and permitting a random location of roll axis X—X dependent solely on the cockpit configuration. Continuing, the motion system of the invention permits infinite pitch radius effects through interaction of the pitch and vertical translation actuators, affords adequate space in the parallel linkage area for balance cylinders or other counter balance devices, and is readily adaptable for scaling either up or down in accordance with the actual weight of the simulated cockpit.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described my invention, what I claim as new and desire to secure by Letters Patent is:

1. A motion system comprising,
   a cockpit housing representative of an aircraft being simulated;
   a base member;
   first and second generally rectangular yoke frames;
   means coupling said cockpit housing member to said second yoke frame including a rear pivotal connection secured to said housing and a slotted forward supporting and restraining guide means secured to said second frame cooperating with the forward end portion of said housing;
   further pivotal means coupling said second frame within said first frame; and
   a four-bar parallelogram linkage mechanism coupling said first frame to said base member.

2. The system of claim 1 including a plurality of actuators operable to independently translate and rotate said housing about a plurality of mutually perpendicular axes, said plurality of actuators being selectively secured to said first and second frames.

3. The system of claim 2 wherein said plurality of actuators provide independent pitch, roll, yaw, and vertical translation motions to said cockpit housing.

4. The system of claim 3 wherein said plurality of actuators provides independently operable ranges of pitch, roll, yaw, and vertical translation motions up to the following selected values:
   30° of nose-up and 10° of nose-down pitch,
   10° of left and right roll,
   10° of left and right yaw, and
   ±12 inches of vertical translation.

5. The system of claim 1 wherein said second frame is independently positionable with respect to said first frame.

6. The system of claim 2 wherein all of said actuators are hydraulically operated.

7. A motion system comprising,
   a cockpit housing representative of an aircraft being simulated;
   a base member;
   first and second frame means supporting said cockpit housing means upon said base member and operative to control the movement thereof;
   said first frame means attached to said base means through a four-bar parallelogram mechanism wherein the rear portion of said first frame provides a first vertical arm of said mechanism; and
   means for raising and lowering said first frame means, including a single hydraulic actuating cylinder positioned behind said cockpit housing and attached to said first vertical arm of said mechanism.

8. The system of claim 7 wherein said first frame means extends through a length $x$ supporting the weight $Pc$ of said cockpit housing, said four-bar parallelogram mechanism extends through a length $y$ and exhibits a weight $Pl$ and $Pt = Pc + Pf + \frac{1}{2}(2Pl)$ independent of $x$ and $y$ wherein:
   $Pt$ = the total load on said cylinder, and
   $Pf$ = the weight of said first and second frame means.

9. The system of claim 7 including a scissor mechanism attached to the forward portion of said first frame means to impart additional lateral stability thereto.

10. The system of claim 7 wherein said second frame means is pivotally connected to said first frame means and is independently movable with respect thereto.

11. The system of claim 9 including further hydraulic actuators selectively secured to said first and second frame means and independently operable to impart pitch, roll, and yaw to said cockpit housing, said single hydraulic actuating cylinder independently operable to impart vertical translation to said cockpit housing.

12. A motion system comprising,
    a flight deck representative of an aircraft being simulated;
    an inner frame member and an outer frame member;
    means pivotally connecting said inner frame to said outer frame, whereby said outer frame positions said inner frame;
    a base support member lagged to a fixed surface;
    a four-bar parallelogram linkage mechanism coupling said outer frame to said base support member, said mechanism including a pair of vertical arms and a pair of generally horizontal arms;
    means for connecting said flight deck to said inner frame member including a rear pivot point and a forward guide slot; and
    a plurality of independently selectively operable actuator means for providing at least four independent degrees of freedom of motion to said flight deck.

13. The system of claim 11 wherein all of said plurality of actuator means are computer controlled.

14. The system of claim 11 wherein all of said plurality of actuators are hydraulically operated.

References Cited by the Examiner
UNITED STATES PATENTS

| | | | |
|---|---|---|---|
| 2,930,144 | 3/1960 | Fogarty | 35—12 |
| 3,085,354 | 4/1963 | Rasmussen et al. | 35—12 |

EUGENE R. CAPOZIO, *Primary Examiner.*

R. E. KLEIN, *Assistant Examiner.*